United States Patent [19]

Allen

[11] Patent Number: 5,572,833
[45] Date of Patent: *Nov. 12, 1996

[54] SELF-HOLDING FIREWOOD COVER

[76] Inventor: Dillis V. Allen, 240 Lincolnshire Ct., Schaumburg, Ill. 60193

[*] Notice: The portion of the term of this patent subsequent to May 13, 2011, has been disclaimed.

[21] Appl. No.: 137,729

[22] Filed: Dec. 24, 1987

[51] Int. Cl.⁶ .................................................. B67D 63/04
[52] U.S. Cl. .......................................... 52/3; 52/5
[58] Field of Search ............................... 52/35; 150/52 R

[56] References Cited

U.S. PATENT DOCUMENTS

| | | | |
|---|---|---|---|
| 356,838 | 2/1887 | Hutchison | 52/3 |
| 358,195 | 2/1887 | Griswold | 52/3 |
| 2,455,237 | 11/1948 | Davis | 52/3 X |

FOREIGN PATENT DOCUMENTS

| | | | |
|---|---|---|---|
| 197560 | 5/1958 | Austria | 52/3 |

*Primary Examiner*—Creighton Smith

[57] ABSTRACT

A cover for a stack of firewood logs including a top cover panel and a plurality of connected loops that receive user installed logs as weights for holding the cover in position.

8 Claims, 1 Drawing Sheet

SELF-HOLDING FIREWOOD COVER

Wet firewood, either from rain or from melting snow, has always been a problem to burn easily in residential fireplaces. Properly stacked firewood, where the logs are laid adjacent and parallel to one another in a facecord stacking configuration, reduces the entry of moisture into the stack because the tight stacking minimizes moisture entry into the stack. However, because the top of the stack is not covered, the first several rows of logs from the top remain exposed for easy entry of moisture, and since the user usually removes logs from the top several rows, it is the most wet logs that are taken inside for burning.

There have been many attempts over the past several decades to devise water repellant covers for firewood stacks, but these have not been particularly commercially successful for two reasons. Firstly, large covers that have been devised that drape completely over the facecord pile to the ground create large air pockets along the sides of the stack that on windy days create a sail effect for the cover ballooning the sides out and tearing or pulling the cover away from whatever hold-down mechanism that is being used. The second problem that has retarded the commercial acceptability of prior known firewood covers is the various mechanisms devised for holding the tarp in position. Usually these tie-down devices are associated with a ground-engaging device, such as a stake, that require the user to bend to the ground at a plurality of locations around the stack to disconnect the tie-down, he then has to straighten up and remove the logs from the top of the pile after folding back the cover, and he then has to pull the cover back down over the side of the pile and again bend to the ground to reconnect the tie-down connections and probably at more than one location.

This is not only a time-consuming procedure, but a difficult one for many people, particularly those with some physical handicap, even though it may be a minor one. It is a primary object of the present invention to ameliorate the problems noted above in protecting firewood from the moisture-producing elements.

SUMMARY OF THE PRESENT INVENTION

In accordance with the present invention, a unitary cover is provided for a stack of firewood logs that requires no tie-down mechanisms because it is self-securing and which permits the removal of logs from the top of the firewood stack without removing the cover from the stack.

Toward these ends, the present firewood cover is essentially a simple one-piece reinforced plastic panel that has a top cover panel that fits over and covers the top of a facecord or less stack with a plurality of loops also formed by the panel that project downwardly along the sides and the ends of the firewood stack that receive logs put in by the user as weights for holding the cover securely in position.

To place the cover in position over a facecord, the top panel is placed on the top of the facecord with the loops falling down the sides and ends of the stack. The user then selects small and medium-sized logs from the stack itself and begins inserting them in the loops around the sides and ends of the stack, although it is desirable that the logs be inserted alternately on opposite sides of the stack to prevent the cover from sliding off the stack during this initial assembly. In the cover design for a standard facecord, which is 8 feet long, 4 feet high, with logs cut to the same length of approximately 16 to 23 inches, there are 4 loops on each side of approximately 23 inches in length, and 1 loop at each end also approximately 23 inches in length.

If one side of the stack or one end of the stack abuts a wall or a solid fence, the loops adjacent that end are simply folded on top of the top panel with an inserted log, and this will hold the tarp in place just as if the loop were hanging down the unexposed side of the stack.

To remove logs from the stack, the user simply flips one of the log-carrying loops up on top of the stack, i.e., on the upper surface of the top panel, removes the desired number of logs and flips the loop back down to the side. As the user repeats this process along the length of the stack using different loops from time to time, the cover will automatically feed itself down the stack as logs are removed until it reaches the ground and no logs remain.

Other objects and advantages will appear in the following detailed description of the invention.

DETAILED DESCRIPTION OF THE PREFERRED EMBODIMENT

Figure 1:
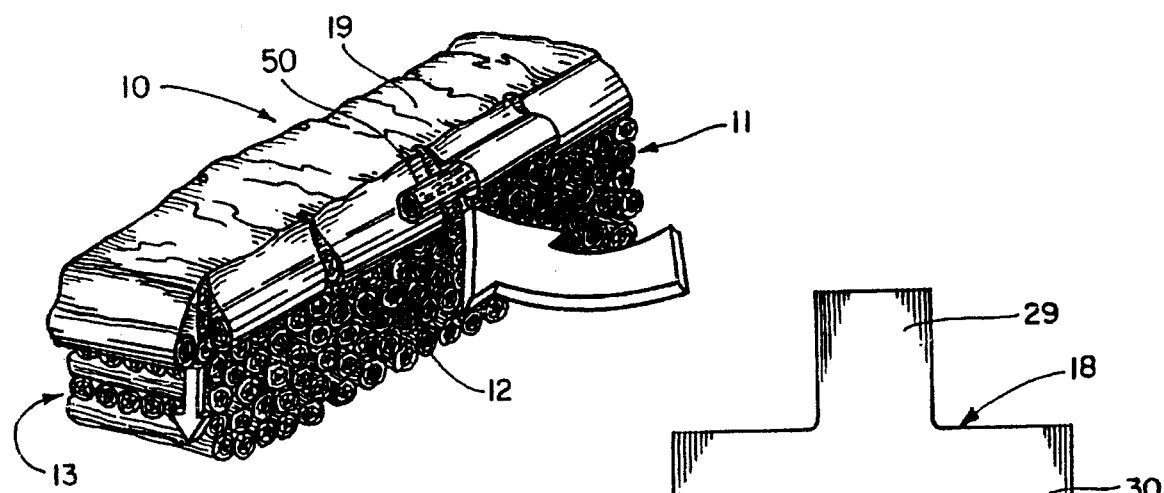
FIG. 1 is a perspective view of the present self-holding firewood stack cover illustrated in position on a facecord of logs.
Figure 3:
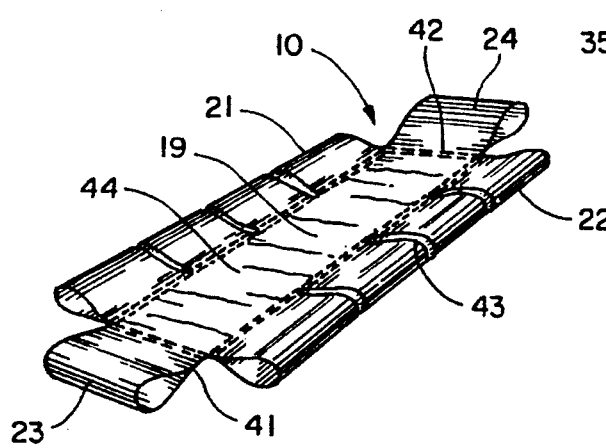
FIG. 3 is a perspective view of the facecord cover illustrated in FIG. 1 and constructed from the sheet or panel illustrated in FIG. 2 without the user-inserted logs; and, FIG. 4 is a perspective fragmentary view similar to FIG. 1 with one of the loops flipped up on top of the cover top panel preparatory to removing logs from the stack.

Referring to the drawings and particularly FIGS. 1 and 3, a self-supporting firewood stack cover 10 is illustrated and is shown in FIG. 1 covering a standard facecord log stack 11 consisting of a plurality of usually split parallel stack of logs 12 with a criss-cross end stack portion 13 that is commonly used to support the free-end of a facecord stack. A facecord of logs is usually defined as a parallel stack of logs 4 feet high, 8 feet long, with the logs being of equal length in the range of 16 to 23 inches. It should be understood that while the stack 11 is 8 feet in length, that the cover 10 can accommodate a lesser length facecord merely by permitting the ends of the cover to drop further over the ends of the facecord. Furthermore, it should be understood that the cover 10 can accommodate a range of log lengths from 16 inches to 24 inches.

Figure 2:
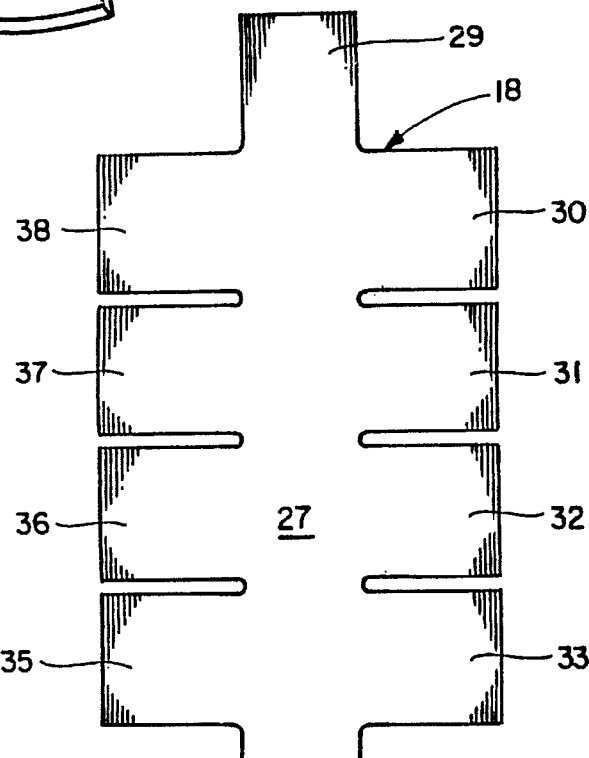
FIG. 2 is a plan view of a pre-cut flexible reinforced plastic sheet from which the cover illustrated in FIG. 1 is manufactured.

The cover 10 is constructed of a single sheet 18 of reinforced flexible plastic having a thickness in the range of 0.004 to 0.010 inches, as seen in FIG. 2. It includes a rectangular top panel 19 having a length of approximately 8 feet and a width of approximately 23 inches with a plurality of integral loops extending outwardly therefrom including left side loops 21, right side loops 22, and end loops 23 and 24. Each of the loops is identical in size and folded flat and has a length of 23 inches along the axis of the loop and a width of approximately 15 inches.

The facecord cover is manufactured from a sheet 18 of reinforced plastic illustrated in planar form in FIG. 2 and is seen to include a central rectangular panel 27 the same size as the top panel 19 and a plurality of rectangular sub-panels 29, 30, 31, 32, 33, 34, 35, 36, 37 and 38 extending outwardly therefrom. The panels 29 to 38 are folded over upon themselves and sewn adjacent the juncture of the top panel and the loops along double sew lines 42, 43, 44 and 45 so that all of loops 22 are formed by a single double sew line 43, loops 21 are formed by a single double sew line 44, and end loops 23 and 24 are formed by double sew lines 45 and 42 respectively. While not shown in the drawings, additional reinforcing material may be added at the corners of the sheet 18 where the sub-panels 29 to 38 meet the central sheet portion 27, if desired for additional strength.

When initialing installing the cover 10 on the facecord 11, the user places the unweighted cover in position with the top panel 19 on the top of the facecord 11. Then, a log such as log 50 illustrated in FIG. 1, is removed from the stack and placed in each of the loops 21, 22, 23, and 24 around the stack preferably alternating the insertion of the logs from one side to the other to keep the cover from slipping off the facecord which will happen if all four logs are inserted in the loops 22 without any logs in the loops 21.

Figure 4:
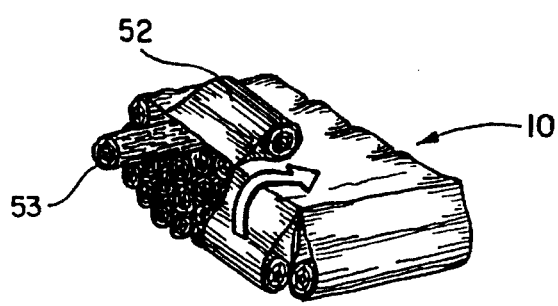

In the event that one side or one end of the stack is up against a wall, the loops along that side or wall still carry log weights, but they are flipped up on top of the top cover panel 19 as seen in FIG. 4 where they remain rested. This is sufficient to hold that side of the cover in place against strong winds.

To remove firewood from the top of the facecord 11 and as seen in FIG. 4, loop 52, which may be either a side loop or end loop, is flipped up on top of the top panel 19 and permitted to rest there while logs 53 are removed from the stack. Thereafter, the loop 52 is flipped back down to its side position.

It should be understood that loops 21, 22, 23 and 24 not only provide the weighting mechanism for the cover 10 in a simple easy and low-cost manner, but they also provide shielding from the elements for the top two or three rows of firewood in the stack.

I claim:

1. A firewood cover for protecting a stack of firewood arranged generally in a facecord or less configuration, comprising; a generally rectangular panel having a central generally rectangular portion adapted to be placed over and cover the top of the firewood stack, said central portion having a length and width, said panel having a plurality of integral loops extending outwardly from the central portion, said loops being constructed to removably receive user installed logs from the same facecord so that the weighted loops extend downwardly from the central portion on the sides of the firewood stack, said loops having a width approximately equal to the width of the central portion of the panel to encompass, substantially cover and secure the logs in the loops against movement by wind or other causes.

2. A firewood cover for protecting a stack of firewood as defined in claim 1, wherein the cover is constructed to feed downwardly as wood is removed from the top of the stack.

3. A firewood cover for protecting a stack of firewood as defined in claim 1, wherein said loops include a plurality of log receiving loops on each side thereof and at least one log receiving loop at each of the central top portion.

4. A firewood cover for protecting a stack of firewood as defined in claim 1, wherein the side loops are directly adjacent one another to protect the sides of the stack.

5. A firewood cover for protecting a stack of firewood as defined in claim 1, wherein the cover is constructed of a reinforced plastic in the range of .004 to 0.010 inches in thickness.

6. A firewood cover for protecting a stack of firewood as defined in claim 1, wherein the central top portion is formed from the same piece of material as the loops.

7. A firewood cover for a fairly standard stack of firewood logs wherein the stack has a rectangular top configuration and a rectangular side configuration, comprising; a single panel of flexible water repellant material having a central rectangular portion sized to fit over and cover the top of the fairly standard firewood stack and outwardly extending panel extensions, said central portion having a length and width, a plurality of log securing loops extending outwardly from the central portion formed by folding over the plurality of panel extensions from the central portion and attaching them to the panel near the central portion, said loops having a width approximately equal to the width of the central portion of the panel to encompass, substantially cover and secure the logs in the loops against movement by wind and other causes.

8. A firewood cover for a fairly standard stack of firewood logs wherein the stack has a rectangular top configuration and a rectangular side configuration, comprising; a single panel of flexible water repellant material having a central rectangular portion sized to fit over and cover the top of the fairly standard firewood stack and a plurality of outwardly extending panel extensions, said central portion having a length and width, a plurality of loops extending outwardly from the central portion formed by folding over the plurality of panel extensions from the central portion and attaching them to the panel near the central portion, said loops including a plurality of loops on each side of the central portion and at least one loop at each end of the central portion constructed and sized to receive logs from the stack as weights so the weighted loops hang downwardly on the sides and ends of the firewood stack, said loops having a width approximately equal to the width of the central portion of the panel to encompass, substantially cover and secure the logs in the loops against movement by wind or other causes.

* * * * *